United States Patent
Xu et al.

(10) Patent No.: US 9,403,225 B2
(45) Date of Patent: Aug. 2, 2016

(54) MITER SAW

(71) Applicant: Chervon (HK) Limited, Wanchai (HK)

(72) Inventors: Kesong Xu, Ningbo (CN); Yun Huang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 266 days.

(21) Appl. No.: 13/858,469

(22) Filed: Apr. 8, 2013

(65) Prior Publication Data

US 2013/0263712 A1  Oct. 10, 2013

(30) Foreign Application Priority Data

Apr. 9, 2012  (CN) .......................... 2012 1 0100286

(51) Int. Cl.
*B26D 1/14*   (2006.01)
*B23D 45/04*  (2006.01)
*B27B 5/29*   (2006.01)

(52) U.S. Cl.
CPC .............. *B23D 45/044* (2013.01); *B26D 1/14* (2013.01); *B27B 5/29* (2013.01); *Y10T 83/7697* (2015.04); *Y10T 83/7788* (2015.04)

(58) Field of Classification Search
CPC ............ Y10T 83/7697; Y10T 83/7705; Y10T 83/7788; Y10T 83/02–83/04; Y10T 83/88632; B23D 45/044; B23D 45/46; B23D 45/48; B27B 5/20

USPC ................ 83/471, 471.3, 581, 473, 490–491, 83/477.1–477.2, 486.1; 409/22; 188/2 F, 188/82, 82.4, 82.7–82.8, 30–31, 69–69, 188/82.1, 84; 292/173, 177, 152, 161, 143; 70/155, 166, 187, 195, 209; 30/377–378

See application file for complete search history.

(56) References Cited

U.S. PATENT DOCUMENTS

| | | | | |
|---|---|---|---|---|
| 4,560,033 A | * | 12/1985 | DeWoody et al. | 188/2 F |
| 5,094,485 A | * | 3/1992 | Lycett | 292/143 |
| 5,870,939 A | * | 2/1999 | Matsubara | 83/471.3 |
| 7,275,470 B2 | * | 10/2007 | Bettacchini | 83/490 |
| 2009/0315237 A1 | * | 12/2009 | Thomas et al. | 269/63 |

* cited by examiner

*Primary Examiner* — Kenneth E. Peterson
*Assistant Examiner* — Nhat Chieu Do
(74) *Attorney, Agent, or Firm* — Greenberg Traurig, LLP

(57) ABSTRACT

A miter saw has a base, a working table arranged above the base and rotatably connected with the base around a pivoting axis, and a cutting assembly having a cutting blade arranged above the working table. A first locking assembly is arranged between the base and the working table for positioning the base and the working table at a certain angle. The first locking assembly includes an operating button rotating about a first pivoting shaft to force the first locking assembly to be in a locked state or an unlocked state, the working table has a shift position hole having a locked type shift position and a released type shift position for locking the rotation positions of the operating button, and the first pivoting shaft is parallel to the cutting blade.

16 Claims, 6 Drawing Sheets

MITER SAW

RELATED APPLICATION INFORMATION

This application claims the benefit of CN 201210100286.1, filed on Apr. 9, 2012, the disclosure of which is incorporated herein by reference in its entirety.

BACKGROUND

The following generally relates to electrical tools and, more particularly, to a miter saw. The miter saw is a common electrical tool, which is mainly used to perform an inclined cutting at a certain angle on an object to be cut. The conventional miter saw includes a base, a working table, a fence arranged on the working table and having a predetermined positional relation with respect to the base, and a cutting assembly having a cutting blade which is arranged above the working table and rotating with respect to the working table, wherein the base and the working table can pivot about a pivoting axis arranged in a vertical direction. When performing an inclined cutting, the base and the working table rotate relatively, and the angle between the cutting blade and the portion of the fence for bearing against the object to be cut is adjusted to the corresponding angle for the inclined cutting, thereby the inclined cutting can be performed. In the real process of the inclined cutting, the base and the working table of the miter saw may have three functions as below: firstly, the working table is completely released relative to the base, thus a free relative rotation therebetween is obtained so as to adjust the angle; secondly, the base and the working table can perform a position locking at some predetermined angles; thirdly, the base and the working table can be adjusted slightly after performing the position locking at some predetermined angles or can perform a position locking at any angle.

For performing the above functions, the existing miter saw usually includes a complicated locking mechanism which is difficult to operate.

SUMMARY

In order to overcome the defect in the prior art and to provide a simpler locking mechanism, the below describes an improved miter saw, particularly one in which the state of the base and the working table can be easily switched with the use of one hand. An example of such an improved miter saw comprises a base, a working table arranged above the base and rotatably connected with the base around a pivoting axis arranged in a vertical direction and a cutting assembly having a cutting blade arranged above the working table. The exemplary miter saw further comprises a first locking assembly arranged between the base and the working table for positioning the elements at a certain angle, the first locking assembly comprising an operating button rotating about a first pivoting shaft to force the first locking assembly to be in a locked state or an unlocked state. In addition, the working table comprises a shift position hole having a locked type shift position and a released type shift position for limiting the rotation positions of the operating button, and the first pivoting shaft being parallel to the cutting blade.

An exemplary miter saw may further comprise a second locking assembly arranged between the base and the working table and rotating around a second pivoting shaft for positioning at any angle. The base comprises a locking mechanism for cooperating with the first locking assembly and the second locking assembly. The working table comprises a mounting mechanism for mounting the first locking assembly and the second locking assembly, and the first pivoting shaft being perpendicular to the second pivoting shaft.

The first locking assembly may comprise a first locking pin for cooperating with the locking mechanism to form limit locking, a mounting support for mounting the first locking pin under the working table, and an operating rod for controlling the first locking pin, wherein the first locking pin is slidably connected with the mounting support and the operating rod is fixedly connected with the first locking pin.

The operating button may be arranged on a free end of the operating rod.

The mounting support may comprise multiple rings for the first locking pin to pass through and a mounting portion arranged on the two sides of the multiple rings and integrated therewith.

The first locking assembly may further comprise an ejecting assembly for ejecting the first locking pin out of the mounting support to lock with the locking mechanism.

The ejecting assembly may comprise a stopping member arranged on the periphery of the first locking pin and among the rings, and a helical spring arranged on the periphery of the first locking pin with one end bearing against the stopping member and the other end bearing against the ring adjacent to the operating rod.

The operating rod may be flexed into a connecting section parallel to the first locking pin, a transition section perpendicular to the connecting section and a mounting section formed by flexing the transition section.

The periphery of the transition section may be socketed with a friction spring.

The operating rod may be fixedly connected with the first locking pin via a thread connection.

The operating rod may be provided with an outer thread at one end and the first locking pin may be formed with a first internal thread hole for cooperating with the outer thread of the operating rod, wherein the operating rod is fixedly connected with the first locking pin by threading the end of the operating rod with outer thread into the first internal thread hole of the first locking pin.

The operating rod may be further socketed with a first locking nut.

A fastening hole may be provided on the wall of the first internal thread hole of the first locking pin, and a fastening pin for fastening the threaded portion of the first locking pin may be arranged in the fastening hole.

The locking mechanism may comprise multiple tapered grooves arranged on multiple corresponding positions on the periphery of the base for cooperating with the first locking pin.

A free end of the first locking pin may be provided with a friction mat.

The axis of the first locking pin may be the first pivoting shaft.

The operating rod may come into contact with the shift position hole when rotating around the first pivoting shaft.

A contour line of the shift position hole may be formed by a rotating shift position, a temporary unlocked shift position and a locked shift position, wherein the locked type shift position includes the locked shift position and the released type shift position includes the rotating shift position and the temporary unlocked shift position.

The rotating shift position may comprise a slide-out section intersecting with the first pivoting shaft slantingly and a limiting section intersecting with the first pivoting shaft vertically, and the slide-out section may be arranged between the limiting section and the first pivoting shaft.

The temporary unlocked shift position may comprise a temporary slide-out section which is symmetrical with the slide-out section about the first pivoting shaft.

The locked shift position may comprise a linear section arranged between the slide-out section and the temporary slide-out section and perpendicular to the first pivoting shaft, and the linear section of the locked shift position may be closer to the locking mechanism than the limiting section.

The second locking assembly may comprise a locking block for pressing and locking with the locking mechanism, a second locking pin for pushing the locking block to press the locking mechanism, a controlling handle for controlling the second locking pin and a cylindrical pin for mounting the controlling handle to the working table. The locking block may be rotatably connected to the working table with a rotating shaft vertical to the axis of the cylindrical pin with the controlling handle rotatably connected to the working table by the cylindrical pin, and the second locking pin rotatably connected to the controlling handle with a rotating shaft parallel to but not superposed with the axis of the cylindrical pin.

The locking block may be provided with multiple arc teeth for pressing the locking mechanism and a restoring member for restoring the locking block when the second locking pin is released.

The locking block may be formed with a contacting groove opening for accommodating the second locking pin.

The controlling handle may be provided with a rotating base and a rotating shaft may be rotatably connected into the rotating base, and the rotating shaft may be provided with a second internal thread hole with the second locking pin located on one end of the controlling handle and fixedly connected therewith by threading the second locking pin with outer thread on the outside thereof into the second internal thread hole.

The end of the second locking pin with outer thread may be socketed with a second locking nut and a spacing sleeve.

The axis defined by the cylindrical pin may be the axis of the second pivoting shaft.

The axis of the second locking pin may be perpendicular to the axis of the cylindrical pin and parallel to the first pivoting shaft.

The locking mechanism may comprise an arc panel for locking with the locking block.

An arc scale for indicating the rotating angle may be arranged between the working table and the base.

The working table may be formed with a mounting and operating portion for mounting the first locking assembly and the second locking assembly.

DETAILED DESCRIPTION

Figure 1:
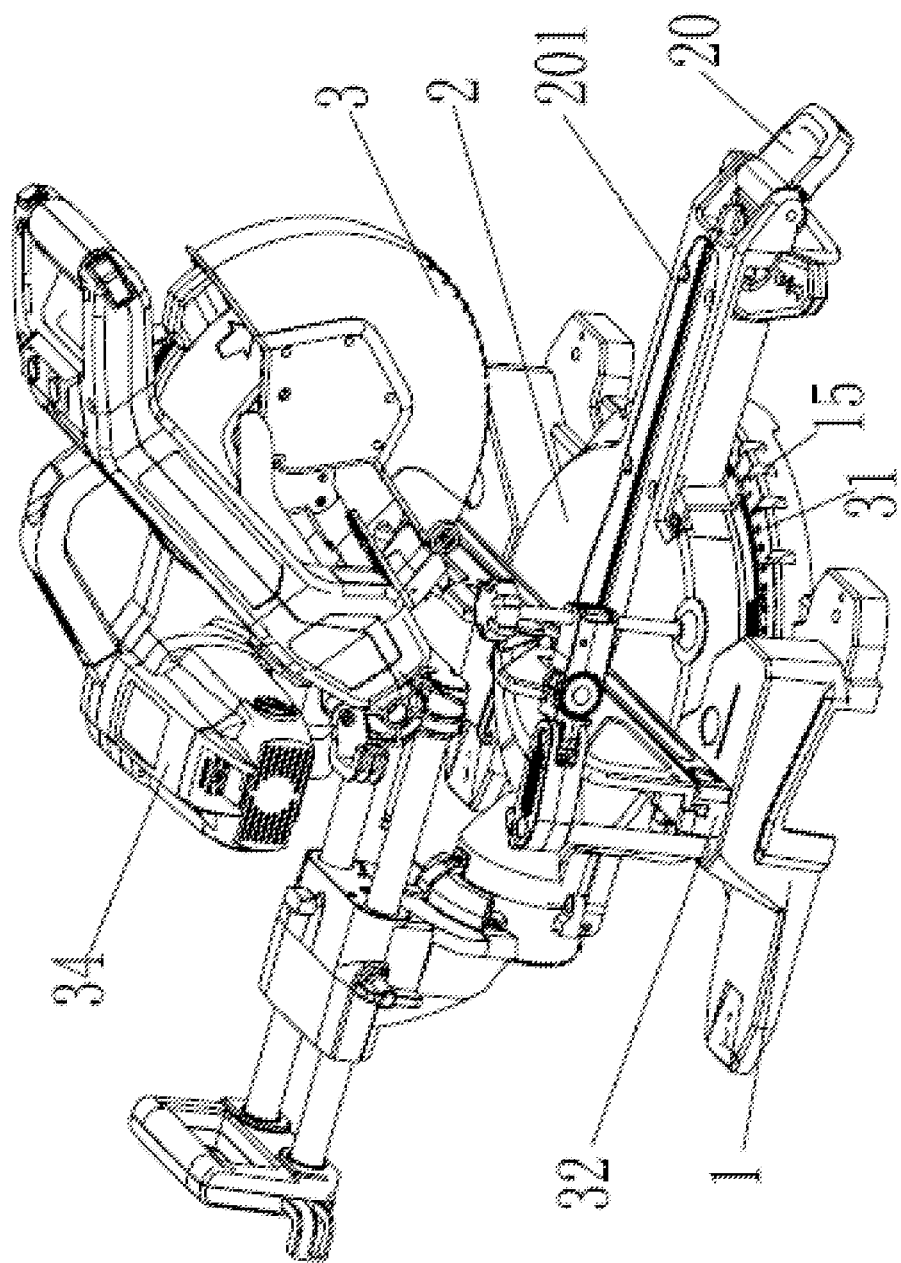
FIG. 1 is a view showing the structure of an exemplary miter saw constructed according to the description which follows.

Referring to FIGS. 1-6, a miter saw mainly comprises a base 1, a working table 2, a cutting assembly, a first locking assembly 100 and a second locking assembly 200. The working table 2 comprises a mounting mechanism 202 for mounting the first locking assembly 100 and the second locking assembly 200.

The base 1 can pivot around a pivoting axis arranged in the vertical direction with respect to the working table 2. The cutting assembly comprises a cutting blade 3 and a motor 34 for driving the cutting blade 3, and the cutting assembly is mounted to the working table 2 by a cutting assembly support and can rotate with the rotation of the working table 2. Additionally, the base 1 is also connected with a fence 32. When performing an inclined cutting, one portion of the fence 32 contacts an object to be cut so as to position the object. The fence 32 is arranged above the working table 2 and fixedly connected with the base 1 when cutting the object, that it to say, the relative position between the fence 32 and the base 1 is not changed. Thus, with the pivoting motion between the base 1 and the working table 2, the angle formed between the cutting blade 3 of the cutting assembly and the fence 32 is also changed, that is to say, the position of the cutting blade 3 relative to the object to be cut may be adjustable for adjusting the angle of the inclined cutting.

In order to fix the adjusted angle, the first locking assembly 100 and the second locking assembly 200 are arranged between the base 1 and the working table 2. Moreover, the base 1 is provided with a locking mechanism 150 for cooperating with the first locking assembly 100 and the second locking assembly 200. The first locking assembly 100 performs a positioning at a certain angle by rotating around a first pivoting shaft 40, and the second locking assembly 200 performs a positioning at any angle by rotating around a second pivoting shaft (not shown but may correspond to the longitudinal axis of the cylindrical pin 21). The first pivoting shaft 40 is parallel to the cutting blade 3 and vertical to the second pivoting shaft. One thing that should be noted is that the first pivoting shaft 40 and the second pivoting shaft are dimensional lines, rather than real shafts and may be the axis of the solid structure in the present invention.

Referring to FIGS. 1-4, the first locking assembly comprises a first locking pin 4, a mounting support 5 and an operating rod 6. The first locking pin 4 is mounted into the mounting support 5, wherein the first locking pin 4 and the mounting support 5 can slide or rotate relative to each other. The operating rod 6 is fixedly connected to the first locking pin 4. The first locking pin 4 is used to lock with the locking mechanism of the base 1, the mounting support 5 is used to enable the first locking pin 4 to be mounted under the working table 2, and the operating rod 6 is used to connect the first locking pin 4 so as to enable the operator to control the operating rod 6 and further control the first locking pin 4. In order to operate the operating rod 6 simply, the first locking assembly also comprises an operating button 14 which rotates around the first pivoting shaft to drive the first locking assembly to be in a locked or unlocked state.

The axis defined by the first locking pin 4 is used as the axis of the first pivoting shaft.

Additionally, the first locking assembly 100 also comprises an ejecting assembly 70. The ejecting assembly 70 is used to enable the first locking pin 4 to keep a trend of ejecting towards the locking mechanism 150 to lock therewith. In this way, when there is no outer force acting on the operating rod 6, the locking pin 4 can lock the base 1 and the working table 2 at a certain angle by aligning with the corresponding locking mechanism. When it needs to be adjusted, the operating rod 6 may be operated to force the first locking pin 4 to move in a direction opposite to the ejecting direction of the ejecting assembly 70, thus the locked state may be released.

Figure 2:
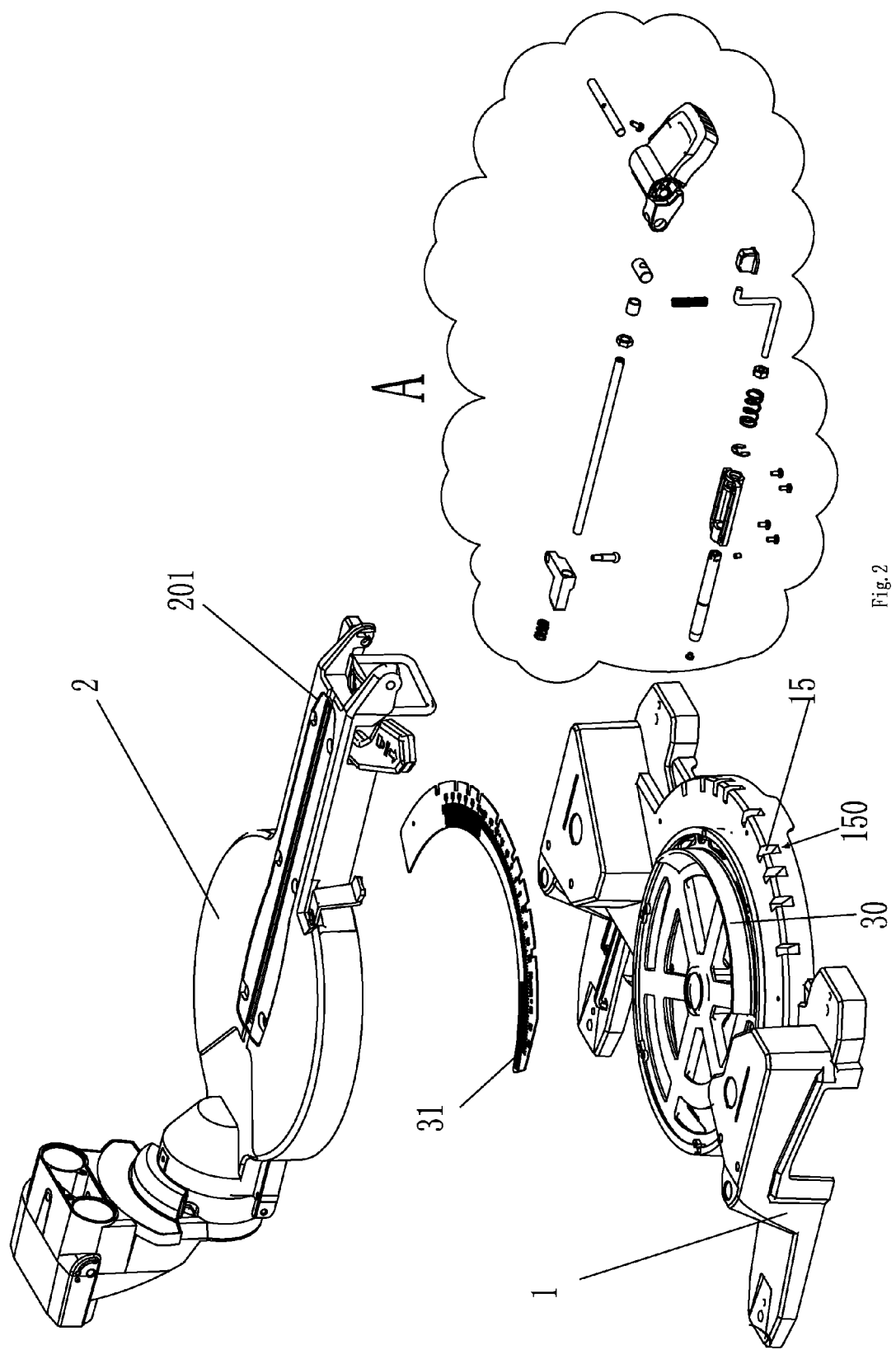
FIG. 2 is an exploded schematic view of the miter saw of FIG. 1.

As a preferable solution, referring to FIGS. 1 and 2, the locking mechanism of the base 1 comprises tapered grooves 15 for cooperating with the first locking pin 4. The advantage of the tapered grooves 15 lies in the possibility of slight adjustment. As a preferable solution, in order to prevent damage to the base 1, the free end of the first locking pin 4 is provided with a friction mat 16.

When locked, the first locking pin 4 is inserted into one of the tapered grooves 15 to lock therewith; when unlocked, the operating rod 6 is operated to retract the first locking pin 4.

As a preferable solution, referring to FIGS. 1-6, in order to enable the operator to control the first locking pin 4 with one hand, the operating rod 6 may be flexed into a connecting section 601 parallel to the first locking pin 4, a transition section 602 perpendicular to the connecting section 601 and an mounting section 603 formed by flexing the transition section 602 for mounting the operating button 14. The working table 2 is provided with a shift position hole 17 for limiting the rotating position of the operating button 14, and the operating rod 6 passes through the shift position hole 17 so that part of the transition section 602 and the whole mounting section are arranged above the shift position hole 17. The contour line 170 of the shift position hole 17 is formed by a locked type shift position and a released type shift position, wherein the locked type shift position includes a locked shift position and the released type shift position includes a rotating shift position and a temporary unlocked shift position. At the rotating shift position, it enables the first locking pin 4 to be located at the unlocked state and keep this state, thus the operator can simply rotate the base 1 and the working table relative to each other; at the temporary unlocked shift position, it enables the first locking pin 4 to be located at a temporarily unlocked state, and can return to the locked state once released by the hand; and at the locked shift position, it enables the first locking pin 4 to lock with the locking mechanism, i.e., one of the tapered grooves 15, under the control of the ejecting assembly, and also limits the position of the operating rod 6 to make it located at a certain position so as to facilitate the next operation.

Figure 6:
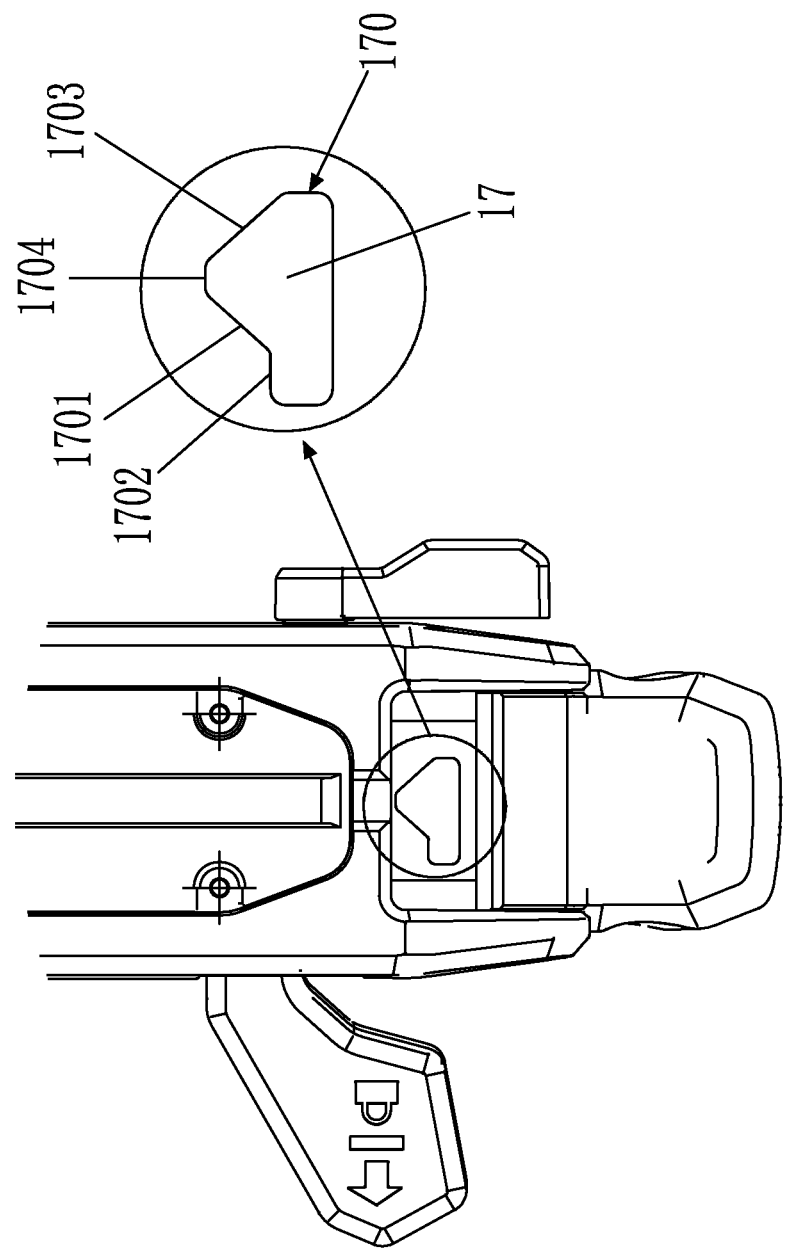
FIG. 6 is a schematic view showing the structure of a shift position hole of the miter saw of FIG. 1.

As shown in FIG. 6, the rotating shift position includes a slide-out section 1701 which intersects with the first pivoting shaft slantingly and a limiting section 1702 which intersects with the first pivoting shaft vertically. The slide-out section 1701 is located between the limiting section 1702 and the first pivoting shaft. The temporary unlocked shift position includes a temporary slide-out section 1703 which is symmetrical with the slide-out section 1701 about the first pivoting shaft. The locked shift position includes a linear section 1704 arranged between the slide-out section 1701 and the temporary slide-out section 1703 and vertical to the first pivoting shaft. The linear section 1704 of the locked shift position is closer to the locking mechanism than the limiting section 1702.

Figure 5:
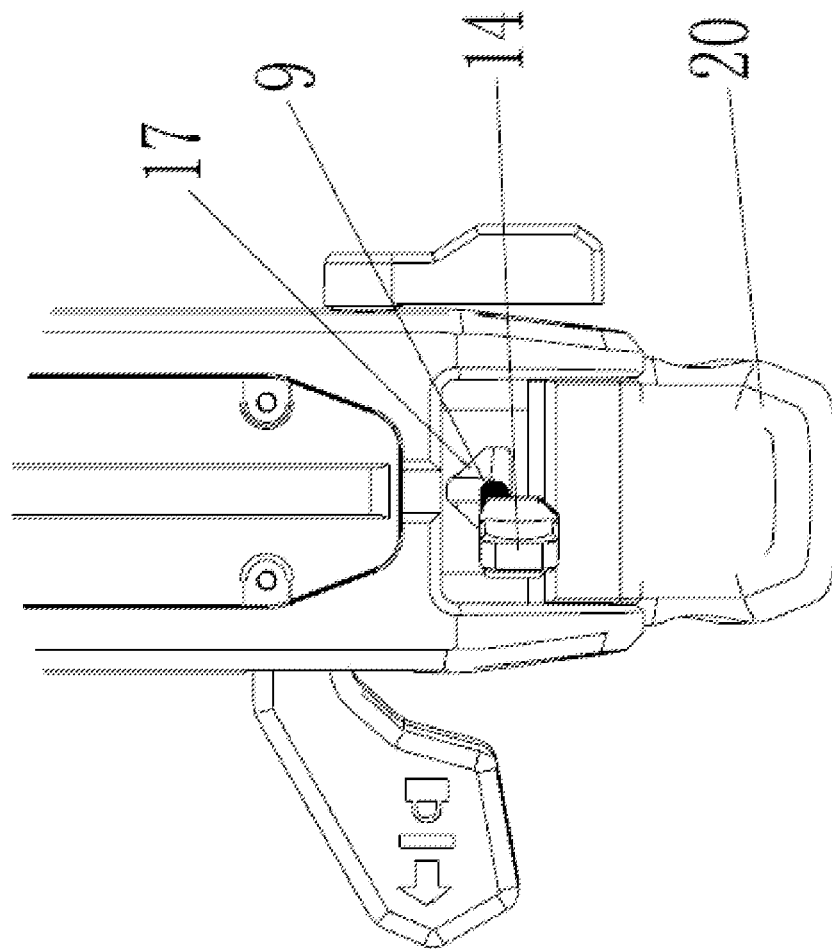
FIG. 5 is a top view of the mounting and operating portion of the miter saw of FIG. 1.

Referring to FIGS. 5-6, the operating rod 6 is pushed via the operating button 14 to rotate towards the rotating shift position around the first pivoting shaft. Since the transition section 602 contacts the slide-out section 1701 of the rotating shift position, once the rotation is accomplished, the operating rod 6 moves gradually in a direction away from the locking mechanism due to the inclining of the slide-out section 1701, and forces the first locking pin 4 to move away from the locking mechanism so as to achieve an unlocking. As rotating continues, the transition section 602 of the operating rod 6 moves to the limiting section 1702. Since the limiting section 1702 is vertical to the first pivoting shaft, i.e., the axis of the first locking pin 4, while the ejecting assembly enables the first locking pin 4 to eject in a direction parallel to the axis of the first locking pin 4, the contact with the limiting section 1702 enables the first locking pin 4 to be located in a stable unlocked state. At this moment, the working table 2 may be rotated freely on the base 1. This shift position is used to make the first locking assembly always located in the released state when locked at any angle. When it needs to lock at a predetermined angle, the operator only needs to push the operating button 14 to rotate the operating rod 6 in an opposite direction around the first pivoting shaft so as to get out of the limiting section 1702 of the shift position hole 17, and then return to the locked shift position under the action of the ejecting assembly. The temporary slide-out section 1703 of the temporary unlocked shift position has the same principle with the slide-out section 1701 of the rotating shift position, and is mainly used to force the first locking pin 4 to unlock with the locking mechanism temporarily when changed between two different angles. Once released by the hand, the first locking pin 4 is locked under the action of the ejecting assembly, thus the temporary unlocked shift position is not provided with a section similar to the limiting section 1702 of the rotating shift position.

As a preferable solution, in order to reduce the friction force between the operating rod 6 and each section of the shift position hole 17 when rotating the operating rod 6, the transition section 602 of the operating rod 6 is socketed with a friction spring 9.

Figure 3:
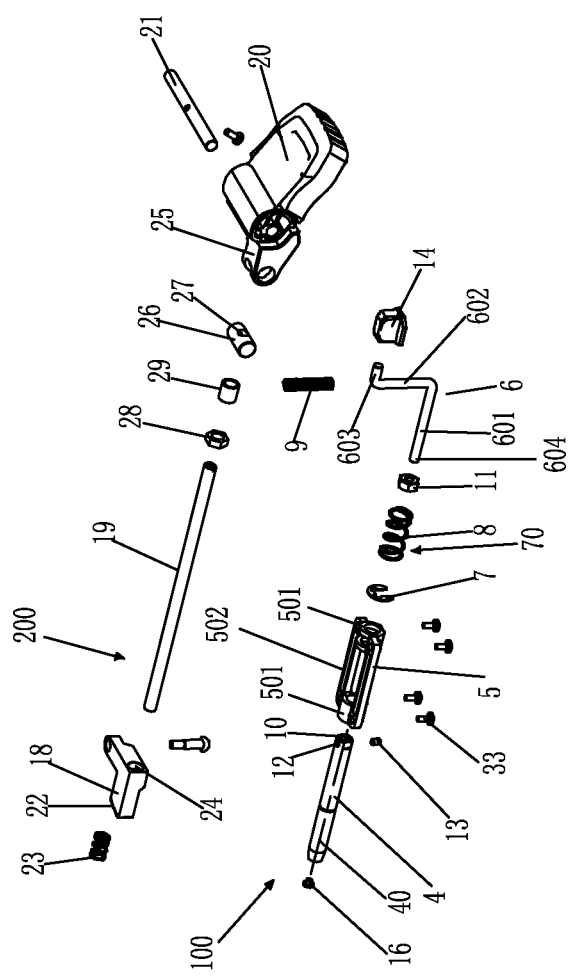
FIG. 3 is an enlarged schematic view of the structure of part A in FIG. 2.
Figure 4:
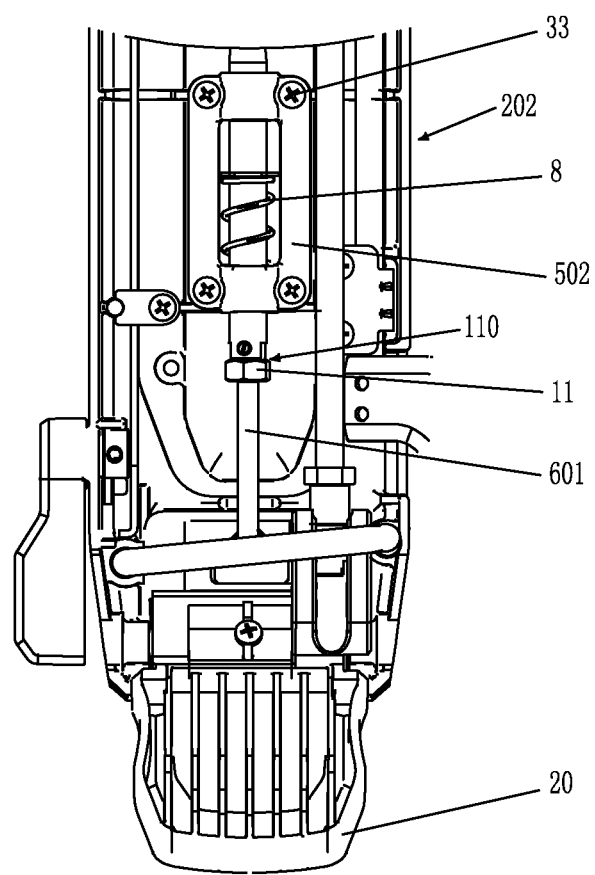
FIG. 4 is a bottom view of an exemplary mounting and operating portion of the miter saw of FIG. 1.

Referring to FIGS. 2-4, the mounting support 5 comprises multiple rings 501 for the first locking pin 4 to pass through and a mounting portion 502 arranged between the multiple rings 501 and integrated therewith. The rings 501 are used for the first locking pin 4 to pass through, and the mounting portion 502 are used to provide a structure to be mounted to the working table 2. As a preferable solution, referring to FIG. 3, the mounting support 5 is mounted under the working table 2 via four screws 33 passing through the mounting portion 502. It should be noted that the first locking pin 4 can slide and rotate in the rings 501.

Certainly, the mounting support 5 may also has other structures as far as it enables the first locking pin 4 to slide and rotate in a predetermined direction therein.

Referring to FIGS. 2-4, the ejecting assembly comprises a stopping member 7 and a helical spring 8. The stopping member 7 is fixedly connected to the periphery of the first locking pin 4. Relative to the mounting support 5, the stopping member 7 is arranged between the mounting portion 502 and the ring 501, thus it can move with the first locking pin 4. The helical spring 8 surrounds the periphery of the first locking pin 4 with one end bearing against the stopping member 7 and the other end bearing against the ring 501 of the mounting support 5 adjacent to the operating rod 6. In this way, the helical spring 8 biases the first locking pin 4 towards the locking mechanism. Certainly, the ejecting assembly may also use other structures with the similar effect, such as magnet, and it is unnecessary to go into details here.

As a preferable solution, the operating rod 6 is provided with outer thread 604 at one end, and the first locking pin 4 is formed with a first internal thread hole 10 for cooperating with the outer thread 604 of the operating rod 6. The end of the operating rod 6 provided with the outer thread 604 is threaded into the first internal thread hole 10 of the first locking pin 4 to fixedly connect therewith. The operating rod 6 is also socketed with a first locking nut 11. A fastening hole 12 is provided on the wall of the first internal thread hole 10 of the first locking pin 4, and a fastening pin 13 for fastening the threaded portion of the first locking pin 4 is arranged in the fastening hole 12. In this way, since the first locking pin 4 is connected to the operating rod 6 by a thread connection 110, and it needs to move the operating rod 6 to force the first locking pin 4 to rotate during the operation, the thread connection 110 is preferably fixed by additional structures. The first locking nut 11 and the fastening pin 13 can enhance the fixing between the operating rod 6 and the first locking pin 4, and after releasing the locking nut 11 and the fastening pin 13, it can perform an adjustment to enable the first locking pin 4 to cooperate with the tapered grooves 15 much better.

Referring to FIGS. 1-3, the second locking assembly comprises a locking block 18 for pressing and locking with the locking mechanism, a second locking pin 19 for pushing the locking block 18 to press the locking mechanism, a controlling handle 20 for controlling the second locking pin 19 and a cylindrical pin 21 for mounting the controlling handle 20 to the working table 2.

The locking block 18 is rotatably connected to the working table 2 with a rotating shaft perpendicular to the axis of the cylindrical pin 21, the controlling handle 20 is rotatably connected to the working table 2 by the cylindrical pin 21, and the second locking pin 19 is rotatably connected to the controlling handle 20 with a rotating shaft parallel to but not superposed with the axis of the cylindrical pin 21. The locking block 18 is preferably made of relative soft materials such as rubber.

In this way, when the controlling handle 20 rotates around the cylindrical pin 21, the second locking pin 19 can bear against the locking block 18 or release the locking block 18. Since the locking block 18 and the working table 20 are connected pivotally, the locking block 18 may rotate a certain angle so as to lock with the locking mechanism tightly when the second locking pin 19 bears against the locking block 18.

As a preferable solution, the locking block 18 is provided with multiple arc teeth 22 for pressing the locking mechanism and a restoring member 23 for restoring the locking block 18 when the second locking pin 19 is released. The locking block 18 is formed with a contacting groove opening 24 for accommodating the second locking pin 19. As a preferable solution, the restoring member 23 may be a spring.

As a preferable solution, the controlling handle 20 is provided with a rotating base 25 and a rotating shaft 26 is rotatably connected into the rotating base 25. The rotating shaft 26 is provided with a second internal thread hole. The second locking pin 19 is located on one end of the controlling handle 20 and fixedly connected therewith by threading the second locking pin with outer thread on the outside thereof into the second internal thread hole 27. The one end of the second locking pin 19 with outer thread is inserted into a second locking nut 28 and a spacing sleeve 29. The second locking nut 28 and the spacing sleeve 29 are used to fix the second locking pin 19 and the rotating shaft 26 much better and adjust the second locking pin relatively.

As a preferable solution, the locking mechanism comprises an arc panel 30 for locking with the locking block 18. Referring to FIG. 2, through contacting and locking between the locking block and the arc panel 30, the base 1 and the working table 2 can be locked at any angle in the range of the arc panel 30 so as to perform a locking at any angle and can adjust slightly after being locked at a certain angle. It should be noted that in the present document, adjusting at any angle means to adjust at any angle in the acceptable range of the locking structure such as the arc panel 30. Since the locking mechanism such as the arc panel 30 has an arc length designed according to the requirements, the angle adjustment may be set as needed by the operator.

The axis of the second locking pin 19 is perpendicular to the axis of the cylindrical pin 21 and parallel to the axis of the first pivoting shaft.

As a preferable solution, an arc scale 31 for indicating the rotating angle is arranged between the working table 2 and the base 1. The working table 2 is formed with a mounting and operating portion 201 for mounting the first locking assembly and the second locking assembly. Referring to FIGS. 1-2, the working table 2 extends outwards to form the mounting and operating portion 201 for mounting the first locking assembly and the second locking assembly.

The present invention is not limited to the above embodiments. It should be noted that all technical solutions obtained by equivalent replacement or equivalent modification are contained in the protection scope of the present invention.

REFERENCE NUMERALS

1 base; 2 working table; 201 mounting and operating portion; 3 cutting blade; 4 first locking pin; 5 mounting support; 501 ring; 502 mounting portion; 6 operating rod; 601 connecting section; 602 transition section; 603 mounting section; 7 stopping member; 8 helical spring; 9 friction spring; 10 first internal thread hole; 11 first locking nut; 12 fastening hole; 13 fastening pin; 14 operating button; 15 tapered groove; 16 friction mat; 17 shift position hole; 1701 slide-out section; 1702 limiting section; 1703 temporary slide-out section; 1704 linear section; 18 locking block; 19 second locking pin; 20 controlling handle; 21 cylindrical pin; 22 arc teeth; 23 restoring member; 24 contacting groove opening; 25 rotating base; 26 rotating shaft; 27 second internal thread hole; 28 second locking nut; 29 spacing sleeve; 30 arc panel; 31 arc scale; 32 fence; 33 screw; 34 motor.

What is claimed is:

1. A miter saw, comprising:
   a base;
   a working table arranged above the base and rotatably connected with the base around a pivoting axis arranged in a vertical direction;
   a cutting assembly having a cutting blade arranged above the working table;
   a first locking assembly arranged between the base and the working table for rotationally positioning the working table at a certain rotational angle relative to the base, the first locking assembly comprising:
   a locking pin having a longitudinal axis and extending radially from the pivoting axis, the locking pin being rotatably coupled to the working table to rotate about the longitudinal axis, and the locking pin being radially, slidably coupled to the working table to be slidable between an unlocked position wherein the locking pin is distally located from the base, and a locked position wherein the locking pin is in contact with the base;
   an operating button operably coupled to the locking pin to actuate the locking pin to rotate about the longitudinal axis and to actuate the locking pin to radially slide relative to the working table, the operating button extending through a shift position hole defined by the working table; and
   the shift position hole comprising a wall to limit the rotational angle of the operating button and to contact the operating button to guide the locking pin between the locked position and the unlocked position as the operating button is rotated within the shift position hole, and wherein the wall defines a first section wherein the operating button is in the unlocked position, a second section wherein the operating button is in a locked position and a third section wherein the operating button is in the unlocked position, a first ramped section is arranged between the first section and the second section, a second ramped section is arranged between the second section and the third section, and the third section includes a stop to maintain the operating button in the unlocked position, and wherein the second section is closer to the pivoting axis than the first section and the third section.

2. The miter saw according to claim 1, wherein the miter saw comprises a second locking assembly arranged between the base and the working table and rotatable around a second pivoting axis for positioning the working table at any angle relative to the base, the working table further comprising a mounting mechanism for mounting the first locking assembly and the second locking assembly to the working table.

3. The miter saw according to claim 2, wherein the second locking assembly comprises a locking block for pressing and locking with a locking mechanism, a second locking pin for pushing the locking block to press the locking mechanism, a controlling handle for controlling the second locking pin and a cylindrical pin for mounting the controlling handle to the working table with the locking block being rotatably connected to the working table with a rotating shaft vertical to an axis of the cylindrical pin, the controlling handle being rotatably connected to the working table by the cylindrical pin, and the second locking pin being rotatably connected to the controlling handle with a rotating shaft parallel to but not superposed with the axis of the cylindrical pin.

4. The miter saw according to claim 3, wherein the locking block is provided with multiple arc teeth for pressing the locking mechanism and a restoring member for restoring the locking block when the second locking pin is released and the locking block is formed with a contacting groove opening for accommodating the second locking pin.

5. The miter saw according to claim 3, wherein the controlling handle is provided with a rotating base and a rotating shaft is rotatably connected into the rotating base and the rotating shaft is provided with a second internal thread hole, wherein the second locking pin is located on one end of the controlling handle and fixedly connected therewith by threading the second locking pin with an outer thread on an outside thereof into an internal thread hole and an end of the second locking pin with the outer thread is surrounded by a locking nut and a spacing sleeve.

6. The miter saw according to claim 3, wherein the axis of the cylindrical pin is the second pivoting shaft.

7. The miter saw according to claim 6, wherein an axis of the second locking pin is perpendicular to the axis of the cylindrical pin and parallel to the first pivoting shaft.

8. The miter saw according to claim 7, wherein the locking mechanism comprises an arc panel for locking with the locking block.

9. The miter saw according to claim 1, wherein the first locking assembly further comprises a mounting support for mounting the locking pin to the working table, and an operating rod for coupling the locking pin to the operating button and wherein the locking pin is slidably connected with the mounting support and the operating rod is fixedly connected with the locking pin.

10. The miter saw according to claim 9, wherein the operating button is arranged on a free end of the operating rod.

11. The miter saw according to claim 10, wherein the mounting support comprises multiple rings for the locking pin to pass through and a mounting portion arranged between the multiple rings and integrated therewith.

12. The miter saw according to claim 11, wherein the first locking assembly comprises an ejecting assembly for biasing the locking pin towards the base and the ejecting assembly comprises a stopping member arranged on a periphery of the locking pin and a helical spring arranged on the periphery of the locking pin with one end of the spring bearing against the stopping member and the other end bearing against the operating rod.

13. The miter saw according to claim 9, wherein the operating rod is comprises a connecting section co-axial with the longitudinal axis of the locking pin, a transition section perpendicular to the connecting section, and a mounting section for extending through the shift position hole and for mounting the operating button, wherein the transition section is at least partially surrounded by a friction spring.

14. The miter saw according to claim 9, wherein the operating rod is fixedly connected with the locking pin via a threaded connection.

15. The miter saw according to claim 9, wherein the base comprises a plurality of tapered grooves arranged on a periphery of the base for receiving the locking pin and preventing relative movement between the base and the working table when the locking pin is received within one of the plurality of tapered grooves.

16. The miter saw according to claim 9, wherein a free end of the locking pin is provided with a friction mat.

* * * * *